United States Patent
Smith et al.

(10) Patent No.: US 8,161,643 B2
(45) Date of Patent: Apr. 24, 2012

(54) METHOD FOR FORMING A COOLING JACKET FOR AN ELECTRIC MOTOR

(75) Inventors: Mark C. Smith, Troy, MI (US); Adam Ritchie, Rochester Hills, MI (US); Vern Caron, Kalamazoo, MI (US); Dennis A. Kramer, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 213 days.

(21) Appl. No.: 12/564,107

(22) Filed: Sep. 22, 2009

(65) Prior Publication Data

US 2010/0007227 A1    Jan. 14, 2010

Related U.S. Application Data

(63) Continuation-in-part of application No. 11/858,372, filed on Sep. 20, 2007, now abandoned.

(51) Int. Cl.
*B21C 23/00* (2006.01)
*B21D 53/02* (2006.01)
*B23P 17/00* (2006.01)
*F28F 7/00* (2006.01)
*H02K 1/32* (2006.01)
*H02K 15/00* (2006.01)

(52) U.S. Cl. ........ 29/890.03; 29/417; 29/596; 72/253.1; 72/254; 165/80.5; 310/64

(58) Field of Classification Search ............ 29/412, 29/417, 596, 890.03, 890.035; 72/253.1, 72/254; 165/80.5; 310/54, 59, 64
See application file for complete search history.

(56) References Cited

U.S. PATENT DOCUMENTS

| | | | | |
|---|---|---|---|---|
| 2,862,120 A * | 11/1958 | Onsrud | | 310/54 |
| 3,009,072 A * | 11/1961 | Mossay | | 310/57 |
| 4,516,044 A * | 5/1985 | Bone | | 310/64 |
| 4,864,172 A * | 9/1989 | Dodt | | 310/59 |
| 4,912,350 A | 3/1990 | Parshall et al. | | |
| 5,448,118 A | 9/1995 | Nakamura et al. | | |
| 5,852,865 A | 12/1998 | Kirtley et al. | | |
| 5,855,055 A * | 1/1999 | Boudreau et al. | | 29/596 |
| 5,939,808 A * | 8/1999 | Adames | | 310/89 |
| 6,900,561 B2 * | 5/2005 | Vlemmings et al. | | 310/59 |
| 2004/0012284 A1 * | 1/2004 | Denton et al. | | 310/89 |
| 2005/0268464 A1 * | 12/2005 | Burjes et al. | | 29/890.035 |
| 2008/0185924 A1 * | 8/2008 | Masoudipour et al. | | 310/54 |

FOREIGN PATENT DOCUMENTS

| | | |
|---|---|---|
| DE | 10320553 | 12/2004 |
| EP | 0424867 | 5/1991 |
| WO | 03100946 | 12/2003 |

OTHER PUBLICATIONS

International Search Report and Written Opinion dated Jan. 5, 2009.

* cited by examiner

*Primary Examiner* — Alexander P Taousakis
(74) *Attorney, Agent, or Firm* — Carlson, Gaskey & Olds, PC

(57) ABSTRACT

A cooling jacket for a motor includes an extruded jacket body having an outer peripheral surface, an inner peripheral surface, and a plurality of discrete cooling passages located between the inner and outer peripheral surfaces that provide multi-directional fluid flow. A fluid inlet is provided to direct cooling fluid into the jacket body and a fluid outlet to direct heated fluid away from the jacket body.

21 Claims, 9 Drawing Sheets

METHOD FOR FORMING A COOLING JACKET FOR AN ELECTRIC MOTOR

RELATED APPLICATION

This application is a continuation-in-part of application Ser. No. 11/858,372, which was filed on Sep. 20, 2007 now abandoned.

TECHNICAL FIELD

The subject invention relates to a cooling jacket for a motor that includes an extruded jacket body with a plurality of cooling passages that cooperate to cool the motor.

BACKGROUND OF THE INVENTION

Power density for an electric motor is related to the size of a rotor and stator. Typically, to increase power density, the size of the rotor and stator have to be correspondingly increased. However, the electric motors can be liquid cooled to increase power density without also having to increase the size of the rotor and stator. Liquid cooling permits higher motor currents for the same size rotors and stators that are not cooled.

Motor cooling jackets are used to provide the liquid cooling. One known motor cooling jacket comprises a single-piece cast component with cast-in-place cooling tubes. This type of cooling jacket is disadvantageous because cast tooling is costly and has long lead times. Also, cast tooling is inflexible in that each different motor configuration requires a unique casting. Further, the cast-in-place cooling tubes are limited in cooling capability.

Cast cooling jackets have traditionally been enclosed at opposing ends with end caps. Coolant flows through the end caps and through channels formed within the jacket. The end caps have to be formed or machined to include fluid channels to permit return fluid flow through the cooling jacket to the opposite end cap. This increases the cost of the cooling jacket.

SUMMARY OF THE INVENTION

A cooling jacket for a motor is comprised of an extruded body including a plurality of discrete cooling passages that provide multi-directional flow within the extruded body as cooling fluid flows from a fluid inlet to a fluid outlet.

In one example, the cooling jacket includes a jacket body that provides a cooling flow path that does not require fluid passages to be formed within jacket end caps to redirect fluid flow between opposing flow directions.

In one example, the jacket body has an outer peripheral surface, an inner peripheral surface, and a plurality of discrete cooling passages located between the inner and outer peripheral surfaces. A fluid inlet is provided to direct cooling fluid into the jacket body and a fluid outlet is provided to direct heated fluid away from the jacket body.

In one example, the jacket body is divided into first and second sections to form separate first and second fluid paths around opposing circumferential portions of the motor. The fluid inlet is associated with one discrete cooling passage with cooling fluid initially being directed in opposing directions from the fluid inlet such that fluid flows initially in one direction into the first fluid path and in an opposite direction into the second fluid path. The fluid outlet is associated with another discrete cooling passage such that fluid from the first and second fluid paths flows towards each other before exiting the fluid outlet.

In one example, each of the first and second cooling paths includes a first set of axial passages providing fluid flow in a first direction generally parallel to a motor axis of rotation, a second set of axial passages providing fluid flow in second direction opposite of the first direction, and set of circumferential passages that connect the first and second sets of axial passages to each other.

In one example, the jacket body is enclosed with at least one end cap. The end cap is attached to one end of the jacket body such that the plurality of discrete cooling passages defines a sealed fluid pathway extending from the fluid inlet to the fluid outlet. The fluid inlet and fluid outlet can be formed within the jacket body or within an end cap. Further, additional fluid inlets and outlets can be included as needed.

In one example the cooling jacket is formed as a single piece extruded structure. In another example, the cooling jacket is formed from a plurality of extruded jacket subsections, which are then secured together to form a complete cooling jacket. The steps include extruding a plurality of jacket portions with each jacket portion including a plurality of discrete cooling passages that define a cooling flow path between the inner and the outer peripheral walls. The plurality of jacket portions are attached to each other to form a complete cooling jacket that is to surround a motor stator, and then first and second end caps, if needed, can be attached to the plurality of jacket portions.

In one example, the end caps are machined to include fluid passages that re-route cooling fluid from one end cap, through the cooling jacket body, and then to the opposite end cap such that a continuous cooling loop is provided through the plurality of jacket portions and the first and the second end caps.

In another example, the cooling jacket itself provides the continuous cooling loop such that the end caps only cap off the flow area.

Another feature of the extrusion process includes forming multiple cooling jackets or jacket sub-sections with a single extrusion process. In the example of a single-piece cooling jacket, the entire cooling jacket body can be extruded as one elongated piece that is then cut to any of various desired lengths. Similarly, an elongated extrusion of a jacket subsection can be cut to any of various desired lengths.

These and other features of the present invention can be best understood from the following specification and drawings, the following of which is a brief description.

DETAILED DESCRIPTION OF THE PREFERRED EMBODIMENT

Figure 1:
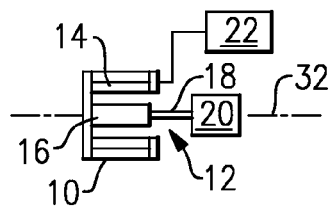
FIG. 1 is a schematic representation of an electric motor with a cooling jacket.

FIG. 1 shows a cooling jacket 10 for an electric motor 12 that has a stator 14 and rotor 16 coupled to an output shaft 18. The output shaft 18 is coupled to drive a vehicle drivetrain component 20, such as a vehicle wheel, for example. The cooling jacket 10 is in fluid communication with a cooling fluid supply 22. The cooling jacket 10 is comprised of a plurality of extruded jacket portions that are attached to each other to surround the electric motor 12.

Figure 2:
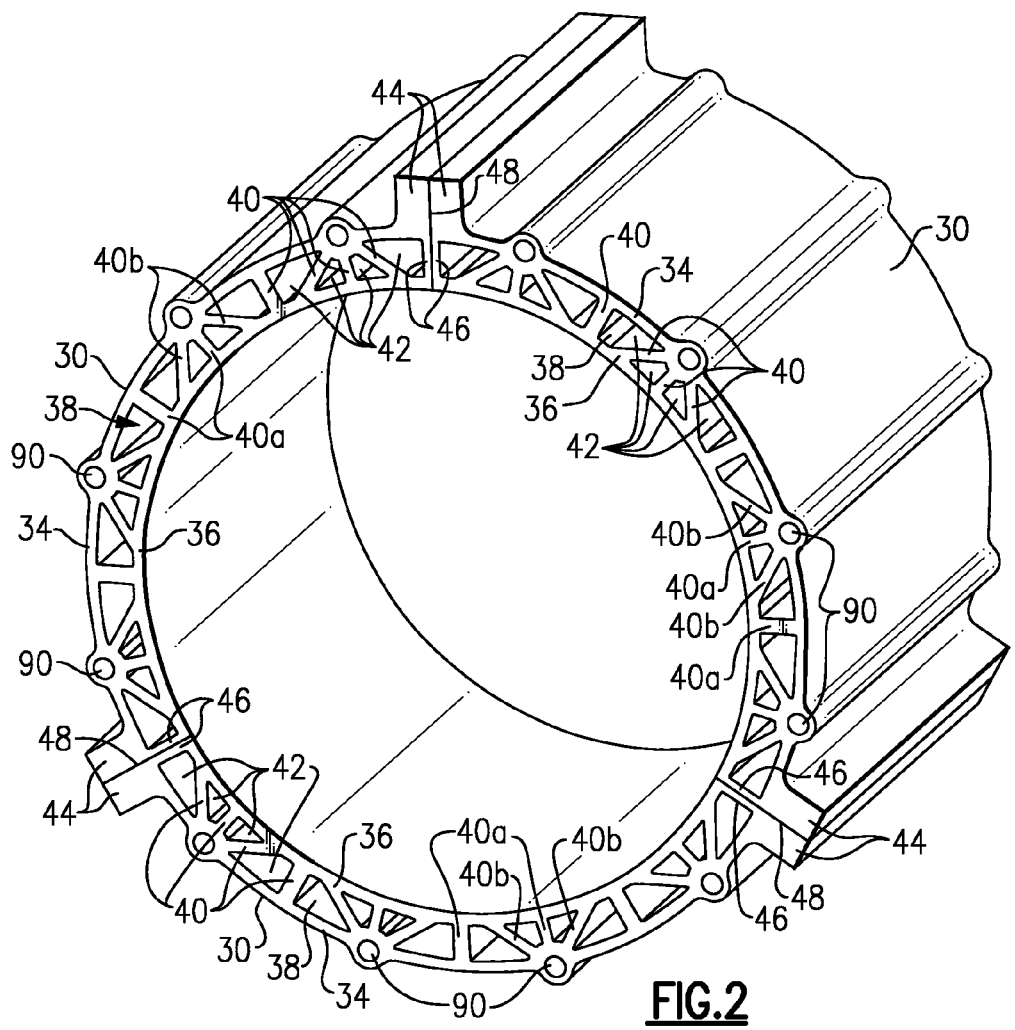
FIG. 2 is a perspective view of one example of a cooling jacket for an electric motor.
Figure 3:
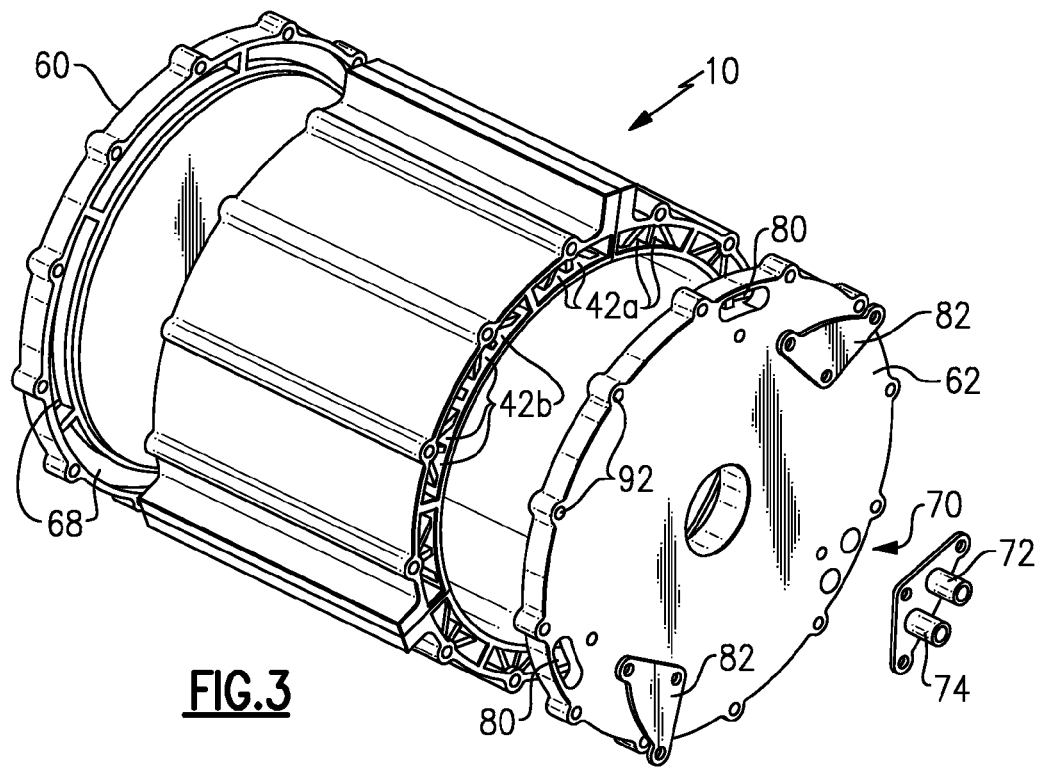
FIG. 3 is a perspective view that shows the cooling jacket of FIG. 1 with ends caps.
Figure 4:
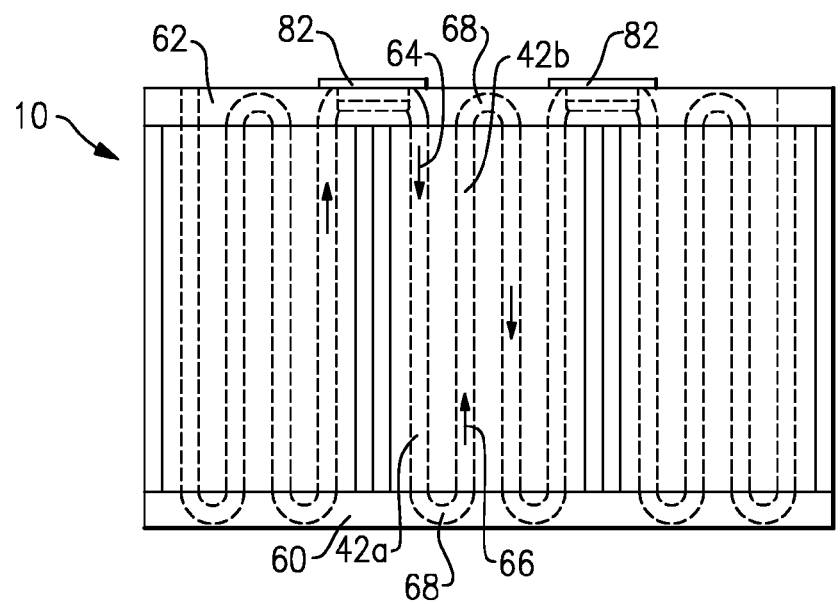
FIG. 4 is a cross-sectional view of a motor with a cooling jacket.
Figure 5:
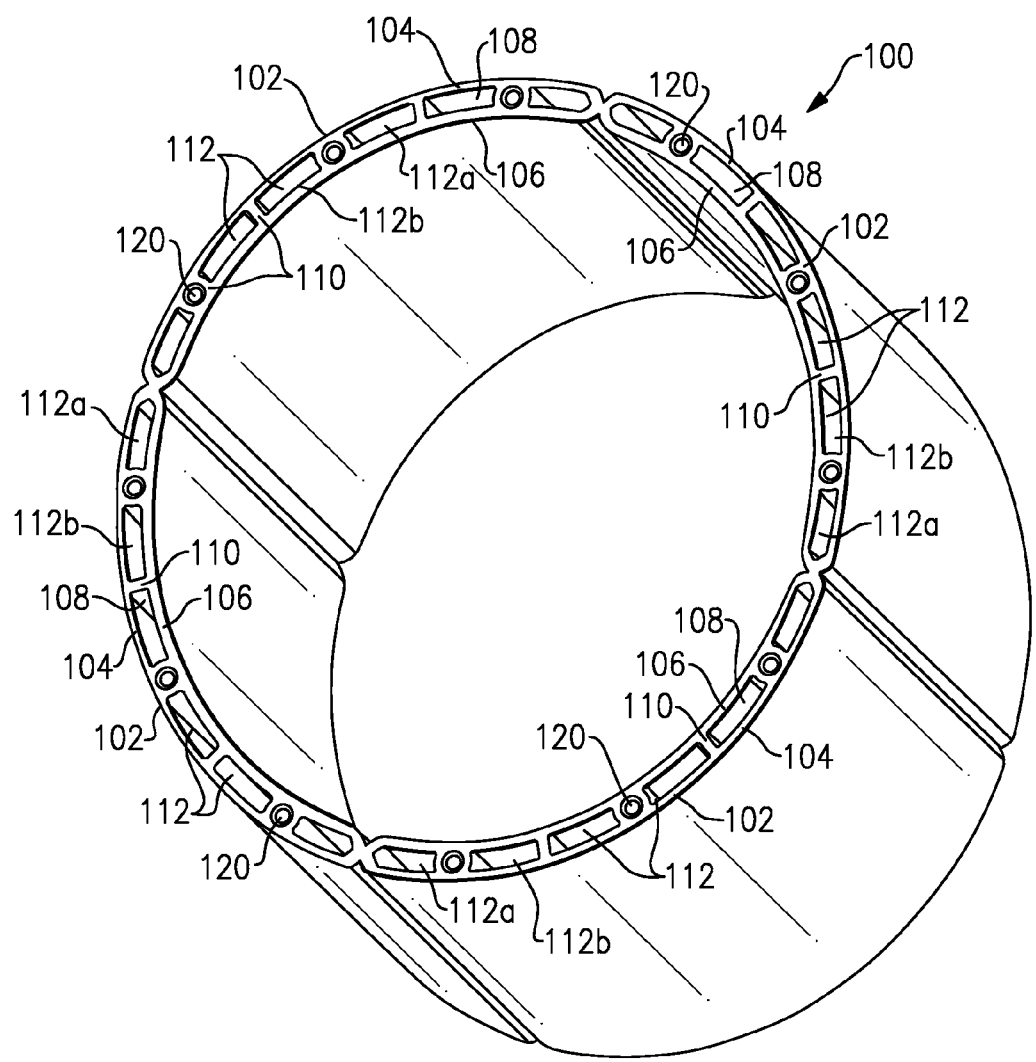
FIG. 5 is a perspective view of another example of a cooling jacket for an electric motor.
Figure 6:
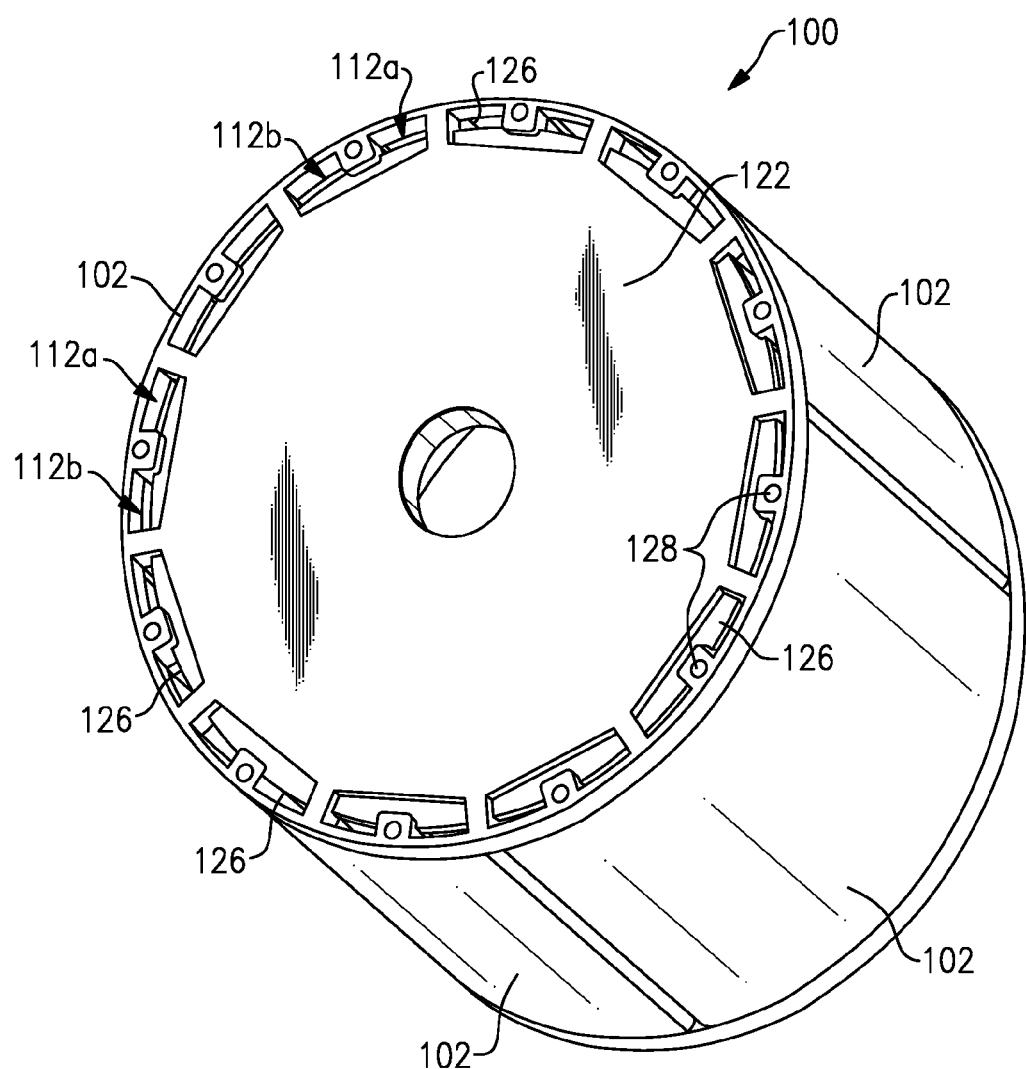
FIG. 6 is a perspective view of the cooling jacket of FIG. 5 showing one end cap.
Figure 7:
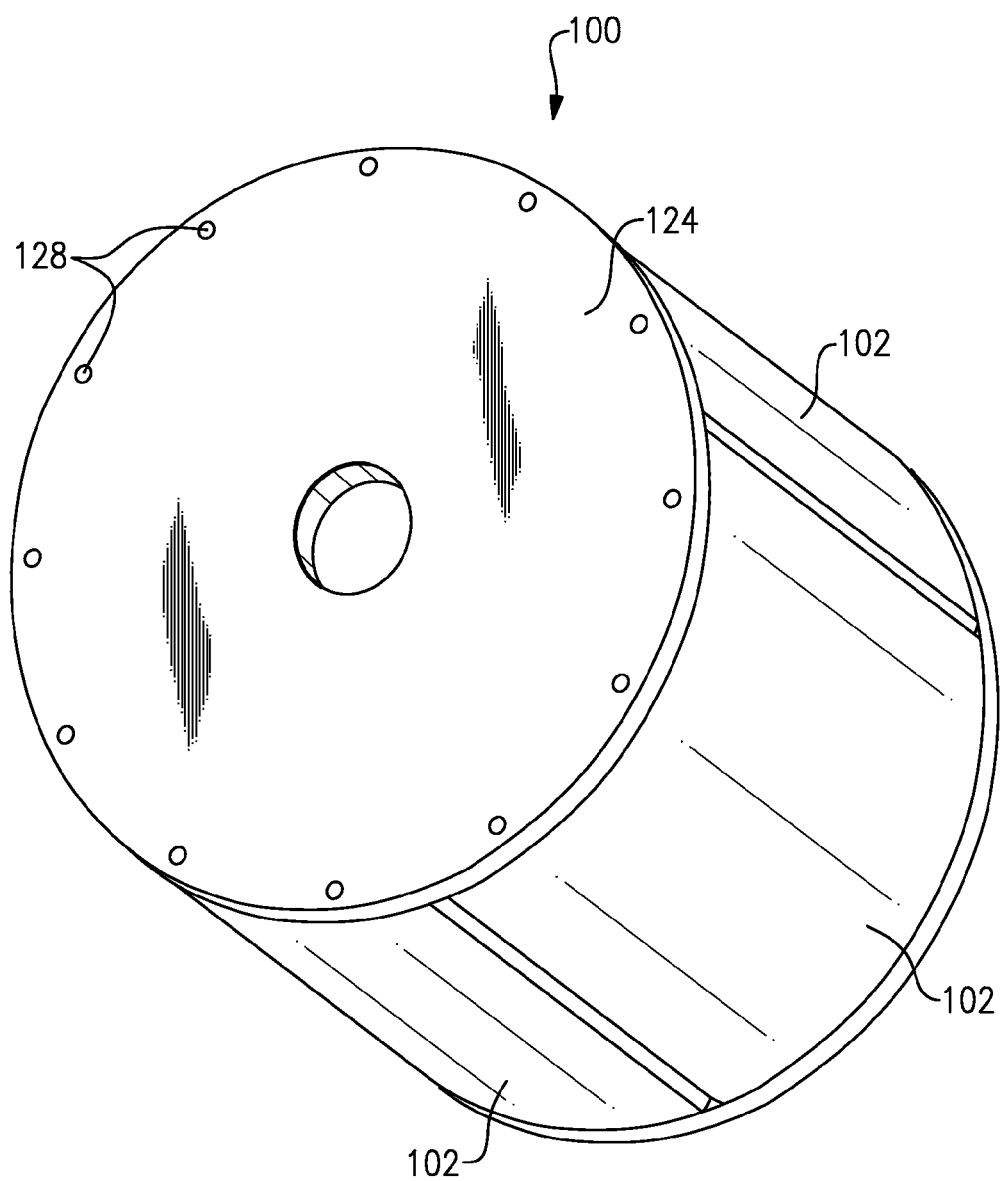
FIG. 7 is a perspective view of the cooling jacket of FIG. 5 showing the other end cap.
Figure 8:
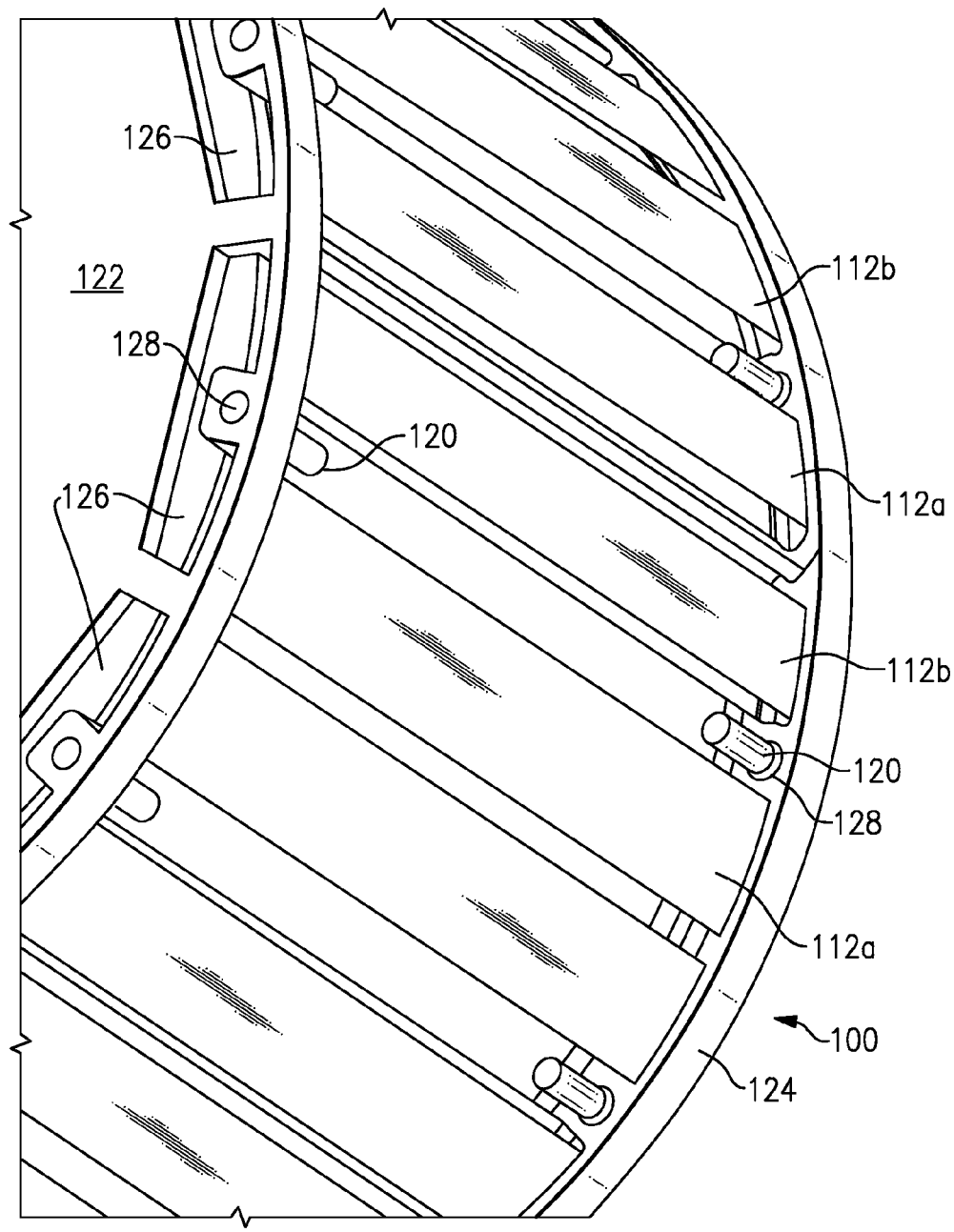
FIG. 8 shows internal fluid passages for the cooling jacket of FIG. 5.

One example of a cooling jacket 10 is shown in FIGS. 2-4. The cooling jacket 10 includes a plurality of jacket portions 30 that are extruded components. In one example, each jacket portion 30 is identical to the other jacket portions 30 such that a single extrusion can be used to form multiple jacket portions, which are then cut to a desired length and attached to each other to surround the electric motor 12.

The electric motor 12 defines a central axis 32 (FIG. 1) about which the output shaft 18 and rotor 16 rotate. Each jacket portion 30 includes an outer peripheral wall 34 and an inner peripheral wall 36 that is spaced inwardly from the outer peripheral wall 34 in a direction toward the central axis 32 to form a cooling space 38 between the inner 36 and outer 34 peripheral walls. Connecting walls 40 interconnect the inner 36 and outer 34 peripheral walls to define a plurality of discrete cooling passages 42 within the cooling space 38. In this example, each jacket portion 30 forms an arced segment that surrounds a portion of the central axis 32. When connected to each other, the jacket portions 30 completely surround the electric motor 12, i.e. the jacket portions 30 extend completely around the central axis 32. In the example shown, the jacket portions cooperate to form a tubular structure that is generally circular in shape; however, other tubular structures with other shape configurations could also be used, such as a square or rectangular shape, for example.

In the example shown in FIGS. 2-4, three (3) jacket portions 30 are used to form the cooling jacket 10. Each jacket portion 30 includes a flange 44 at each arc end 46. A flange 44 from one jacket portion 30 is abutted against a flange 44 from an adjacent jacket portion 30 to form a joint interface 48. The jacket portions 30 are secured to each other at the joint interfaces 48. In the example shown, the jacket portions 30 are welded to each other at the joint interface 48, however, other attachment methods could also be used, such as fasteners (bolts, screws, rivets, etc.), clamps, bands, straps, a keyed connection, a dovetail connection, or spring fasteners for example. In another example configuration, the flanges 44 could be eliminated such that edges of the arc ends 46 are welded directly to each other.

The plurality of discrete cooling passages 42 are shown in greater detail in FIGS. 3-4. In this example, the connecting walls 40 that form the cooling passages 42 include a set of radial walls 40a, which extend radially away from the central axis 32, from the inner peripheral wall 36 to the outer peripheral wall 34. The connecting walls 40 also include a set of angled walls 40b that extend obliquely relative to the radial walls 40a. In the example shown, the radial walls 40a are alternated with the angled walls 40b such that each radial wall 40a is positioned between a pair of angled walls 40b, and each angled wall 40b is positioned between a pair of radial walls 40a.

First 60 and second 62 end caps are secured to the jacket portions 30 to enclose the plurality of discrete cooling passages such that a continuous cooling loop is provided through the plurality of jacket portions 30 and the first 60 and second 62 end caps to cool an outer periphery of the electric motor 12. In each jacket portion 30, at least some of the cooling passages 42a are for fluid flow in a first direction, i.e. toward one end cap 60 along the central axis 32 as indicated by arrow 64, and at least some of the cooling passages 42b are for fluid flow in a second direction as indicated by arrow 66 (opposite of the first direction), i.e. toward the opposite end cap 62. The end caps 60, 62 include connecting fluid passages 68 formed within the respective end cap 60, 62 such that fluid can flow back and forth between the cooling passages 42a and 42b. In another optional example, fluid can flow in only one direction but such a configuration is not as beneficial as fluid flow in at least two different directions.

One of the end caps 60, 62 includes a connection interface 70 for fluid communication with the cooling fluid supply 22. The connection interface 70 includes a fluid inlet 72 that is connected to the cooling fluid supply 22 and a fluid outlet 74 that transfers heated fluid out of the electric motor 12 to be cooled for recirculation back through the cooling fluid supply 22.

One of the end caps 60, 62 also includes fluid connection interfaces 80 that allow fluid to be transferred between adjacent jacket portions 30. The fluid connection interfaces 80 are aligned generally with the joint interfaces 48 of the jacket portions 30. Cover plates 82 are used to cover and seal the fluid connection interfaces 80. In the example shown in FIG. 3, there are three (3) joint interfaces 48. Two of the joint interfaces are aligned with fluid connection interfaces 80, and the third joint interface has a fluid communication transfer via the fluid inlet 72 and fluid outlet 74. Gaskets (not shown) can be used at the cover plates and/or between the end caps and jacket portions as needed to provide a tightly sealed environment.

Each jacket portion 30 also includes a plurality of holes 90 that receive fasteners (not shown) to secure the end caps 60, 62 to the jacket portions 30. The end caps 60, 62 also include holes 92 that are aligned with the holes 90 in the jacket portions 30.

The jacket portions 30 are secured together to form the tubular cooling jacket 10 that surrounds the stator 14 and is in thermal contact with the stator 14. The jacket portions 30 are identical segments that are extruded from an extrusion die. The segments are attached to the stator 14 by a "hot dropping" process to form a complete band in tension. Hot dropping refers to a process where the jacket portions 30 are secured together with their inner peripheral surfaces subsequently being machined to provide a final inner diameter size. Then the formed cooling jacket is heated and pressed to a cooler stator until both the jacket 10 and the stator 14 are at a common temperature. This provides the band of tension.

Another example of a cooling jacket 100 is shown in FIGS. 5-8. This configuration is similar to that of FIGS. 2-4 but uses four jacket portions 102 instead of three. The jacket portions 102 are secured together as described above to completely surround the central axis 32. Each jacket portion 102 includes an outer peripheral wall 104 and an inner peripheral wall 106 that is spaced inwardly from the outer peripheral wall 104 in a direction toward the central axis 32 to form a cooling space 108 between the inner 106 and outer 104 peripheral walls. Connecting walls 110 interconnect the inner 106 and outer 104 peripheral walls to define a plurality of discrete cooling passages 112 within the cooling space 108. Thus, each jacket portion 102 forms an arced segment that surrounds a portion of the central axis 32.

The connecting walls 110 in this configuration are generally radial walls that extend in a generally radial direction away from the central axis 32 from the inner peripheral wall 106 to the outer peripheral wall 104. The connecting walls 110 are spaced apart from each other about the central axis 32 to form the cooling passages 112. Some of the cooling passages (FIGS. 5 and 8) 112a flow in one direction along the central axis 32 and some of the cooling passages 112b flow in an opposite direction along the central axis 32. In this configuration, the cooling passages 112a and 112b alternate with each other.

Between each pair of passages 112a and 112b is a hole 120 that is to receive a fastener (not shown) that is used to secure first 122 (FIG. 6) and second 124 (FIG. 7) end caps to the jacket portions 102. The end caps 122, 124 include fluid connection interfaces 126 formed within the caps that allow fluid to transfer between the alternating flow cooling passages 112a and 112b. One of the fluid connection interfaces 126 is fluidly connected to an inlet and outlet associated with the cooling fluid supply 22 as described above.

Further, the end caps 122, 124 include holes 128 that are aligned with holes 120 in the jacket portions 102. The fasteners extend into the holes 120, 128 to secure and clamp the jacket portions 102 and end caps 122, 124 together in compression.

A method for forming the cooling jackets described above includes the following steps. A plurality of jacket portions 30, 102 are extruded with each jacket portion 30, 102 including an outer peripheral wall 34, 104, an inner peripheral wall 36, 106 spaced inwardly from the outer peripheral wall 34, 104 to form a cooling space 38, 108 between the inner and the outer peripheral walls, and a plurality of connecting walls 40, 110 extending between the inner and the outer peripheral walls to form a plurality of discrete cooling passages 42, 112 within the cooling space. The jacket portions 30, 102 are attached to each other to form a tubular cooling jacket 10, 100 that surrounds a motor stator 14. Then, first 60, 122 and second 62, 124 end caps are attached to the plurality of jacket portions to enclose the plurality of discrete cooling passages such that a continuous cooling loop is provided through the plurality of jacket portions and the first and the second end caps.

In an alternate configuration, the cooling jackets 10, 100 could also provide for unidirectional flow. In this configuration, cooling fluid would flow through the cooling passages from one end cap to the other end cap. Cooling fluid would be supplied to one end cap at an inlet, cooling fluid would flow in one direction through the cooling passages, and would then exit the other end cap via an outlet. The heated cooling fluid would then be cooled back down and routed back to the inlet via the cooling fluid supply to provide a continuous cooling loop.

During the extrusion process, the jacket portion is extruded to form an elongated jacket portion. The jacket portions are identical to each other such that the elongated jacket portion is cut into sections of identical length to each other, with the cut sections being attached to each other to surround the stator. This is a very cost effective method for forming a cooling jacket. Also, the jacket portions can be cut to different lengths from the elongated extrusion to accommodate different motor configurations.

Figure 9:
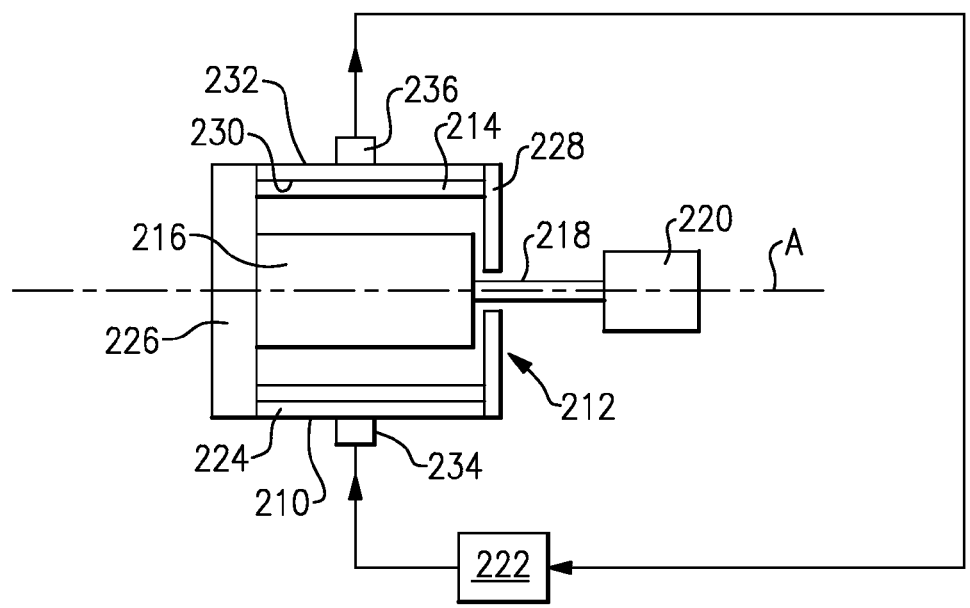
FIG. 9 is a schematic representation of an electric motor with another example of a cooling jacket.

FIG. 9 shows another example of a cooling jacket 210 for an electric motor 212 that has a stator 214 and rotor 216 coupled to an output shaft 218. The output shaft 218 is coupled to drive a vehicle drivetrain component 220, such as a vehicle wheel, for example. The cooling jacket 210 is in fluid communication with a cooling fluid supply 222.

The cooling jacket 210 includes a jacket body 224 with first 226 and second 228 end caps at opposing end faces of the jacket body 224. The jacket body 224 includes an inner peripheral surface 230 and an outer peripheral surface 232. At least one fluid inlet 234 is formed within the outer peripheral surface 232 to direct cooling fluid from the fluid supply 222 into the jacket body 224. At least one fluid outlet 236 is formed within the outer peripheral surface 232 to direct heated fluid away from the jacket body 224 and then back to the fluid supply. Additional inlets and outlets could also be provided in the cooling jacket as needed. Further, the inlets and outlets could optionally be located within the end caps as indicated at I/O in FIG. 10 for example.

Figure 10:
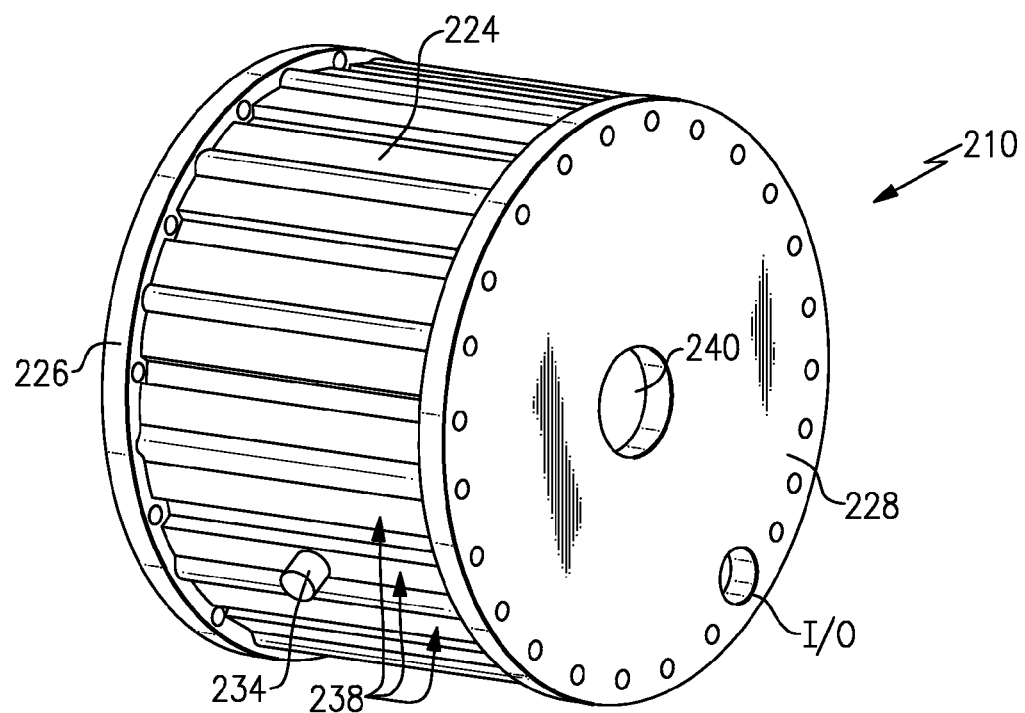
FIG. 10 is a perspective view of one example of the cooling jacket of FIG. 9 with first and second end caps.
Figure 11:
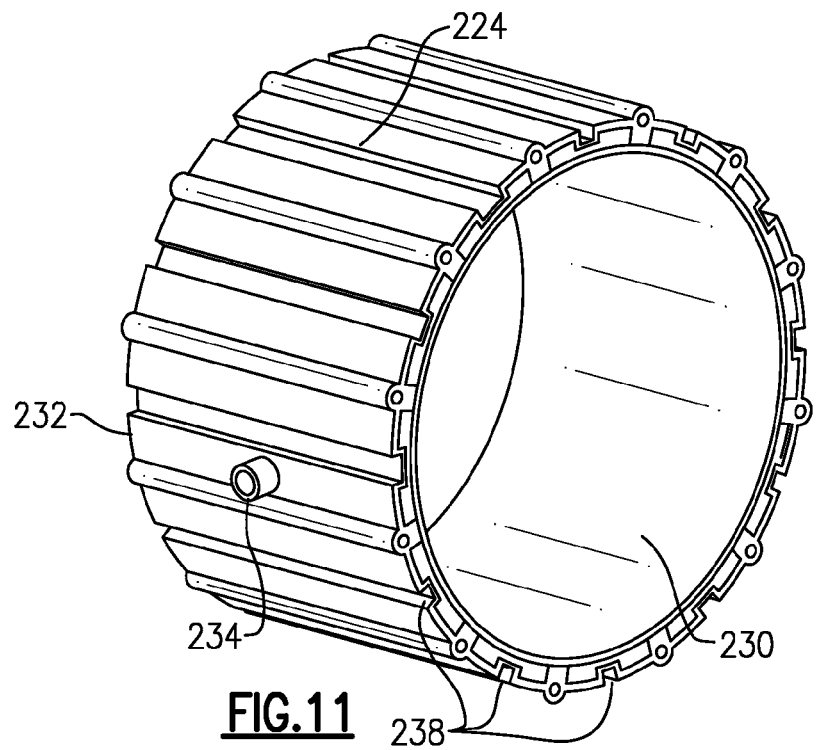
FIG. 11 is a perspective view that shows the cooling jacket of FIG. 10 without end caps.

As shown in FIGS. 10-11, the jacket body 224 comprises a single-piece extruded structure that includes a plurality of discrete cooling passages 238 that cooperate together to provide at least bi-directional fluid flow throughout the entire jacket body 224. Optionally, the extruded structure could be comprised of a plurality of sections that are attached to each other to form a complete cooling jacket. The cooling passages 238 are comprised of cooling tubes or channels that are formed as part of the jacket body 224 during extrusion. This will be discussed in further detail below.

As shown in FIG. 10, the second end cap 228 includes an opening 240 to allow the output shaft 218 to extend outwardly of the cooling jacket 210 for attachment to the drivetrain component 220. As discussed above, the drivetrain component 220 could comprise a component such as a vehicle wheel; however, the electric motor 212 could also be configured to be part of a hybrid vehicle configuration to drive components such as a driveshaft, transmission, differential, etc.

Figure 12:
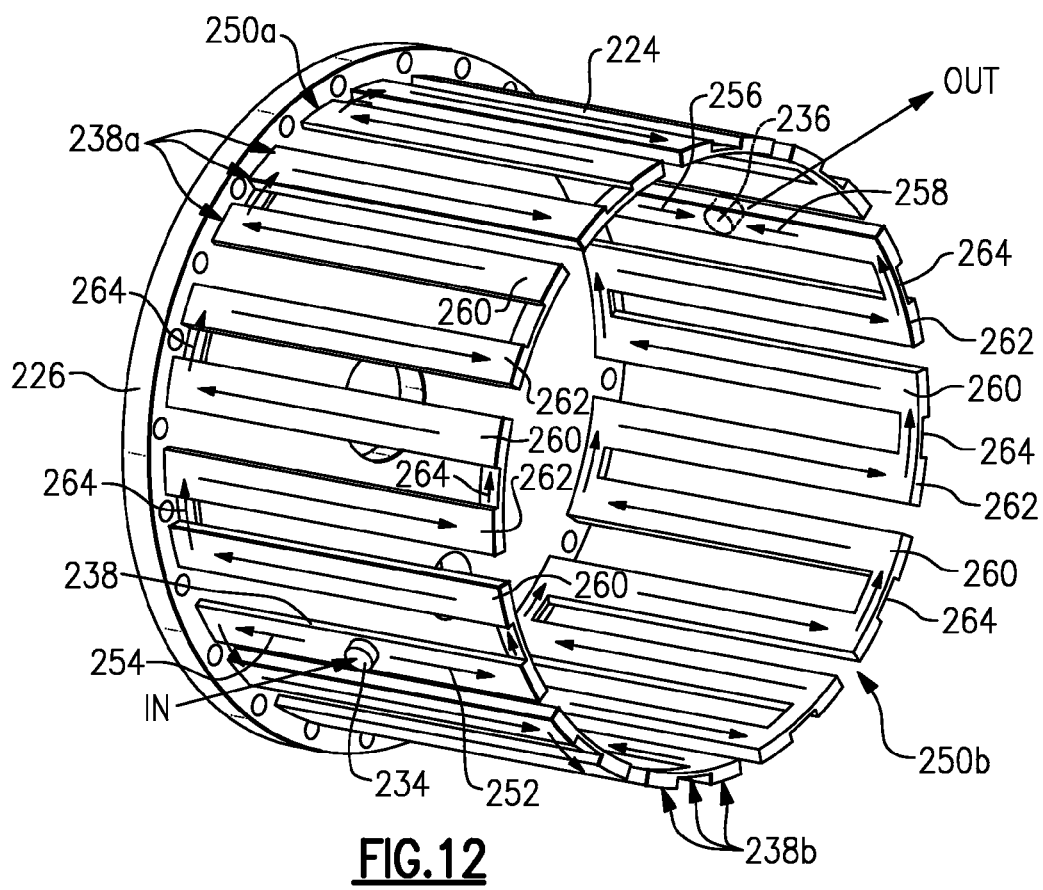
FIG. 12 is a perspective view of a cooling tube flow path within the cooling jacket of FIG. 11 that bypasses end caps but uses end caps to provide an enclosed configuration as shown in FIG. 10.

As shown in FIG. 12, the plurality of discrete cooling passages 238 are divided to provide first 250a and second 250b parallel flow paths about a circumference of the electric motor 212. A first set of cooling passages 238a defines the first flow path 250a and a second set of cooling passages 238b defines the second flow path 250b. The first flow path 250a extends about a first portion of a motor circumference and the second flow path 250b extends about a remaining portion of the motor circumference.

The fluid inlet 234 is associated within one of the cooling passages 238 and receives cooling fluid from the fluid supply 222. Once the cooling fluid initially enters the cooling passage 238, the fluid flows in two opposing flow directions indicated respectively by arrows 252 and 254. A first flow direction 252 begins the first flow path 250a and a second, opposite, flow direction 254 begins the second flow path 250b. The first 250a and second 250b flow paths travel in parallel about the motor circumference and meet at the fluid outlet 236 from opposing directions as indicated by opposing arrows 256, 258. The first flow direction 256 defines the end of the first flow path 250a and the second flow direction 258 defines the end of the second flow path 250b. The first and second flow paths meet at the fluid outlet 256 where they both exit the cooling jacket 210.

Each of the first 250a and second 250b flow paths includes a first set of axial passages 260 allowing fluid flow in a first direction, a second set of axial passages 262 allowing fluid flow in a second direction opposite of the first direction, and a set of circumferential passages 264 that connect the first 260 and second 262 sets of axial passages. In one example, each circumferential passage 264 connects one end of a first axial passage 260 to an associated end of an adjacent second axial passage 262. The first 260 and second 262 sets of axial passages generally extend along a length of the electric motor 212 and are generally parallel to a motor axis of rotation A (FIG. 9). The circumferential passages 264 extend circumferentially about the motor axis of rotation A.

As shown in FIG. 12, the first end cap 226 has an opening through which the motor output shaft 218 extends to provide a two output shaft motor configuration. Optionally, one of the first 226 and second 228 end caps could provide a solid end face without an opening. In either configuration, when the first end cap 226 is secured to the jacket body 224, it is clear that the cooling fluid bypasses traveling through the end cap. The second end cap 228 would be similarly configured. As such, the end caps do not have to be machined or otherwise modified to allow fluid flow to be redirected in an opposite direction toward the opposing end cap.

Figure 13:
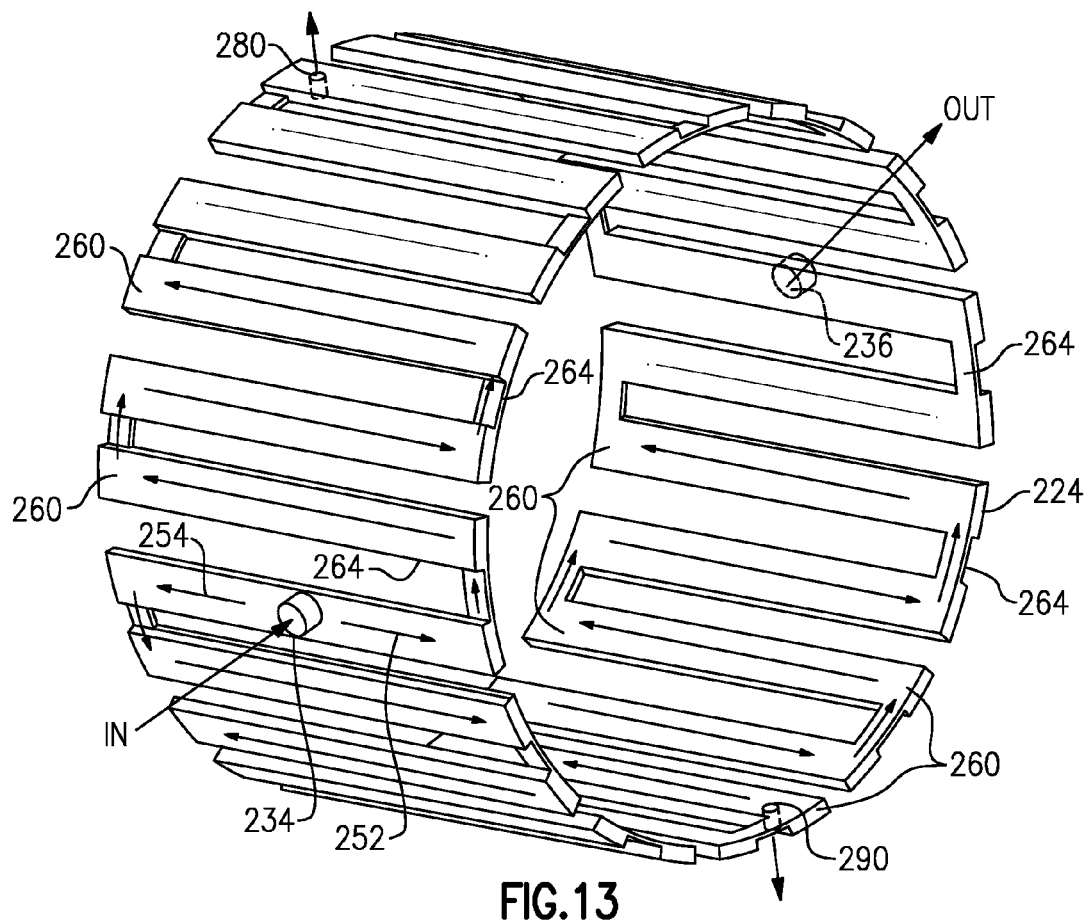
FIG. 13 is a perspective view similar to FIG. 12 but which does not include the end cap and which shows a fluid inlet and fluid outlet.

As shown in FIG. 13, the cooling jacket 210 also includes at least one vent 280 and/or at least one drain 290. In the example shown, the vent 280 is associated with the first flow path 250a and the drain 290 is associated with the second flow path 250b. The locations of the vent 280 and drain 290 are merely examples and the locations could vary depending upon the size and orientation of the electric motor within the vehicle. Further, additional vents and/or drains could be included as needed, or certain configurations may not need any vents or drains.

As discussed above, the cooling jacket 210 is made utilizing an extrusion process. A method for forming the cooling jacket 10 includes the following steps. In one example, the jacket body 224 is extruded as a single-piece cylindrical structure that is to completely surround the motor. Optionally, multiple jacket sections could be extruded and then secured to each other to form a complete jacket body. The jacket body 224 includes an outer peripheral surface 232, an inner peripheral surface 230, and a plurality of discrete cooling passages 238 located between the inner 230 and the outer 232 peripheral surfaces. In one example, the at least one fluid inlet 234 is formed within the outer peripheral surface 232 to direct cooling fluid into the jacket body 224, and the at least one fluid outlet 236 is formed within the outer peripheral surface 232 to direct heated fluid away from the jacket body 224. Optionally, the fluid inlet and outlet could be located in either or both of the end caps as described above. The plurality of discrete cooling passages 238 cooperate together to provide bi-directional, or multi-directional, fluid flow throughout the entire jacket body 224 as fluid moves from the fluid inlet 234 to the fluid outlet 236. For example, some cooling passages 238 direct fluid flow in one direction while other fluid passages 238 direct fluid flow in an opposite direction. Further, fluid flow is directed in a direction transverse to the direction defined by the cooling passages 238 via circumferential passages 264.

The cooling passages 238 are configured such that fluid passages do not need to be formed within the end caps to redirect fluid flow between opposing flow directions. Instead, the circumferential passages 264 that connect the first 260 and second 262 sets of axial passages are used to redirect fluid flow.

During the extrusion process, the jacket body 224 is extruded to form an elongated cooling jacket. The elongated cooling jacket is then cut to a desired length. The elongated cooling jacket can thus be easily formed to provide multiple cooling jackets from a single extrusion. Each cooling jacket can be cut to the same length, or can be cut to different lengths to accommodate larger or smaller motors. This is a very cost effective method for forming a cooling jacket. Optionally, a single extrusion could provide a single cooling jacket. This would be useful if a sufficiently large press is provided, or if the motor is small enough for such a configuration.

Figure 14:
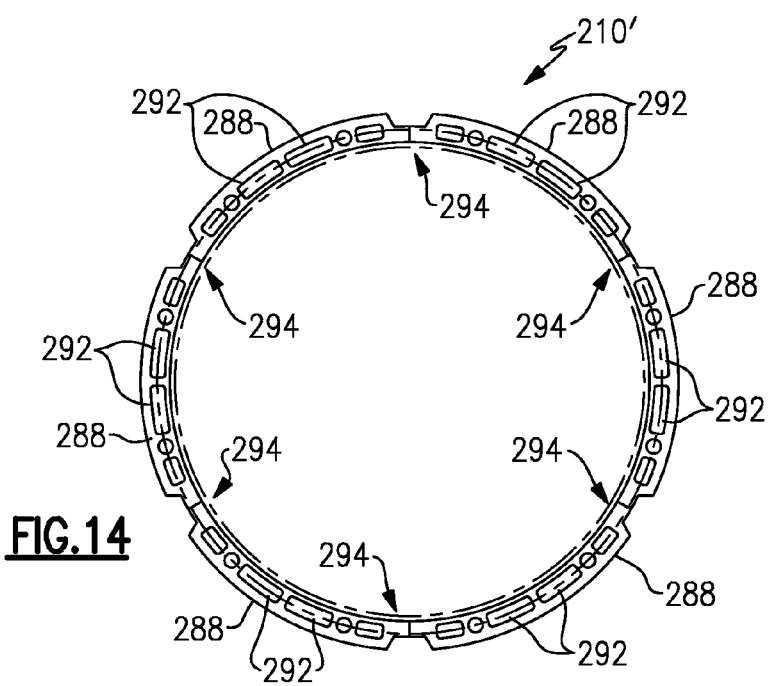
FIG. 14 is an end view showing a cooling jacket configuration such as that of FIGS. 9-13 formed from multiple jacket subsections.

An example of a cooling jacket 210' that is formed from multiple jacket sections 288 is shown in FIG. 14. Each jacket section 288 includes at least one discrete cooling passage 292 and opposing end faces of adjoining sections are abutted against each other, as indicated at 294, when the jacket sections 288 are attached to each other to form the complete cooling jacket 210'. In one example, each jacket section 288 corresponds to a sixty degree section of the overall cooling jacket. The sections are cut to length as described above and then the six pieces are attached to each other. It should be understood that a greater or lesser number of jacket sections could also be used to form the cooling jacket. Further, the jacket sections 288 can be attached to each other by welding, fasteners, or any other type of attachment method.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for forming a cooling jacket for an electric motor comprising the steps of:
   (a) extruding a jacket body that includes an outer peripheral wall, an inner peripheral wall, and a plurality of discrete cooling passages located between the inner and the outer peripheral walls, the jacket body to substantially surround a motor component;
   (b) attaching a jacket end cap to each end of the jacket body;
   (c) forming at least one fluid inlet in the outer peripheral wall to direct cooling fluid into the jacket body;
   (d) forming at least one fluid outlet in the outer peripheral wall to direct heated fluid away from the jacket body such that the plurality of discrete cooling passages defines a cooling flow path that bypasses jacket end caps as fluid moves from the fluid inlet to the fluid outlet; and
   (e) dividing the jacket body into first and second sections to form separate first and second fluid paths around opposing circumferential portions of a motor component, associating the at least one fluid inlet with one discrete cooling passage with cooling fluid being directed in opposing directions from the fluid inlet such that fluid flows initially in one direction into the first fluid path and in an opposite direction into the second fluid path, and associating the at least one fluid outlet with another discrete cooling passage such that fluid from the first and second fluid paths flows towards each other before exiting the fluid outlet.

2. The method according to claim 1 including extruding the jacket body to have an initial length and cutting the jacket body to a first length that is shorter than the initial length to form a first cooling jacket for a first motor configuration.

3. The method according to claim 2 including cutting the jacket body to a second length that is shorter than the initial length to form a second cooling jacket for a second motor configuration, the second length being different from the first length.

4. The method according to claim 1 including forming each of the first and second fluid paths to include a first set of cooling passages for fluid flow in a first direction along a motor axis of rotation, a second set of cooling passages for fluid flow in a second direction opposite of the first direction, and a third set of cooling passages to connect the first and second sets of cooling passages to each other.

5. The method according to claim 1 including attaching the end caps to the jacket body such that the plurality of discrete cooling passages defines a sealed fluid pathway from the fluid inlet to the fluid outlet that does not go through the end cap.

6. The method according to claim 1 including extruding the jacket body as a plurality of jacket sections and attaching the jacket sections to each other to form one complete cooling jacket.

7. The method according to claim 1 including:
forming each of the first and second fluid paths to include a first set of axial passages allowing fluid flow in a first direction, a second set of axial passages allowing fluid flow in a second direction opposite of the first direction, and a set of circumferential passages that connect the first and second sets of axial passages;
forming each circumferential passage to connect one end of a first axial passage to an associated end of an adjacent second axial passage;
forming the first and second sets of axial passages to generally extend along a length of the motor component and to be generally parallel to a motor axis of rotation; and
forming the circumferential passages to extend circumferentially about the motor axis of rotation.

8. The method according to claim 7 including forming a first plurality of openings in the end caps and forming a second plurality of openings in each end of the jacket body to be aligned with the first plurality of openings, the first and second plurality of openings configured to receive fasteners to attach the end caps to the jacket body, and including positioning the second plurality of openings to be in alignment with the circumferential passages.

9. The method according to claim 1 including forming at least one vent that is associated with at least one of the first and second fluid paths.

10. The method according to claim 1 including forming at least one drain that is associated with at least one of the first and second fluid paths.

11. The method according to claim 1 including forming at least one vent in the first fluid path and forming at least one drain in the second fluid path.

12. The method according to claim 1 including positioning the fluid inlet such that inlet flow is immediately split into a first axial flow extending along a length of the jacket body toward one end cap and a second axial flow extending along a length of the jacket body toward the other end cap.

13. A method for forming a cooling jacket for an electric motor comprising the steps of:
(a) extruding a plurality of jacket portions with each jacket portion including an outer peripheral wall, an inner peripheral wall spaced inwardly from the outer peripheral wall, and a plurality of discrete cooling passages formed between the inner and the outer peripheral walls;
(b) attaching the plurality of jacket portions to each other to form one complete cooling jacket that is to surround a motor stator;
(c) attaching at least one end cap to the complete cooling jacket;
(d) forming at least one fluid inlet in the outer peripheral wall to direct cooling fluid into the cooling jacket,
(e) forming at least one fluid outlet in the outer peripheral wall to direct heated fluid away from the cooling jacket such that the plurality of discrete cooling passages defines a cooling flow path that bypasses the end cap as fluid moves from the fluid inlet to the fluid outlet; and
(f) dividing the cooling jacket into first and second sections to form separate first and second fluid paths around opposing circumferential portions of a motor component, associating the at least one fluid inlet with one discrete cooling passage with cooling fluid being directed in opposing directions from the fluid inlet such that fluid flows initially in one direction into the first fluid path and in an opposite direction into the second fluid path, and associating the at least one fluid outlet with another discrete cooling passage such that fluid from the first and second fluid paths flows towards each other before exiting the fluid outlet.

14. The method according to claim 13 wherein the at least one end cap comprises first and second end caps, and wherein step (c) includes attaching the first and second end caps to opposing ends of the complete cooling jacket such that a continuous cooling loop, either in series or parallel, is provided through the plurality of jacket portions and that bypasses the first and the second end caps.

15. The method according to claim 13 including providing a continuous cooling loop through the plurality of jacket portions that bypasses the at least one end cap.

16. The method according to claim 13 including:
forming each of the first and second fluid paths to include a first set of axial passages allowing fluid flow in a first direction, a second set of axial passages allowing fluid flow in a second direction opposite of the first direction, and a set of circumferential passages that connect the first and second sets of axial passages;
forming each circumferential passage to connect one end of a first axial passage to an associated end of an adjacent second axial passage;
forming the first and second sets of axial passages to generally extend along a length of the motor component and to be generally parallel to a motor axis of rotation; and
forming the circumferential passages to extend circumferentially about the motor axis of rotation.

17. The method according to claim 16 including forming a first plurality of openings in the end cap and forming a second plurality of openings in one end of the cooling jacket to be aligned with the first plurality of openings, the first and second plurality of openings configured to receive fasteners to attach the end cap to the cooling jacket, and including positioning the second plurality of openings to be in alignment with the circumferential passages.

18. The method according to claim 13 including forming at least one vent that is associated with at least one of the first and second fluid paths.

19. The method according to claim 13 including forming at least one drain that is associated with at least one of the first and second fluid paths.

20. The method according to claim 13 including forming at least one vent in the first fluid path and forming at least one drain in the second fluid path.

21. The method according to claim 13 wherein the at least one end cap comprises a first end cap secured to one end of the cooling jacket and a second end cap secured to an opposite end of the cooling jacket, and including positioning the fluid inlet such that inlet flow is immediately split into a first axial flow extending along a length of the cooling jacket toward the first end cap and a second axial flow extending along a length of the cooling jacket toward the second end cap.

* * * * *